(12) United States Patent
Chew et al.

(10) Patent No.: US 8,281,229 B2
(45) Date of Patent: Oct. 2, 2012

(54) FIRMWARE VERIFICATION USING SYSTEM MEMORY ERROR CHECK LOGIC

(75) Inventors: Yen Hsiang Chew, Penang (MY); Bok Eng Cheah, Penang (MY); Kooi Chi Ooi, Penang (MY); Shanggar Periaman, Penang (MY)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 12/345,868

(22) Filed: Dec. 30, 2008

(65) Prior Publication Data

US 2010/0169750 A1 Jul. 1, 2010

(51) Int. Cl.
*G06F 11/10* (2006.01)
(52) U.S. Cl. ............. 714/807; 714/36; 714/42; 714/48; 714/54; 714/718; 714/737; 714/758; 714/766; 714/781; 714/782; 714/784; 714/785; 714/799; 714/800; 714/801; 714/802; 714/808; 726/16; 713/1; 713/2
(58) Field of Classification Search ........................ None
See application file for complete search history.

(56) References Cited

U.S. PATENT DOCUMENTS

| | | | |
|---|---|---|---|
| 6,401,208 B2 * | 6/2002 | Davis et al. .................... 713/193 |
| 7,263,617 B2 * | 8/2007 | Conti et al. .................... 713/188 |
| 7,520,811 B2 * | 4/2009 | LeMay et al. .................... 463/29 |
| 7,788,506 B2 * | 8/2010 | Bancel et al. .................. 713/193 |
| 7,954,153 B2 * | 5/2011 | Bancel et al. .................... 726/22 |
| 2004/0255124 A1 * | 12/2004 | Courcambeck et al. ....... 713/176 |
| 2005/0033951 A1 * | 2/2005 | Madter et al. ...................... 713/2 |
| 2005/0160217 A1 * | 7/2005 | Gonzalez et al. ................. 711/6 |
| 2005/0228980 A1 * | 10/2005 | Brokish et al. .................... 713/2 |
| 2008/0077801 A1 * | 3/2008 | Ekberg .......................... 713/187 |
| 2008/0141017 A1 * | 6/2008 | McCoull et al. .................. 713/2 |
| 2008/0256363 A1 * | 10/2008 | Balacheff et al. ............. 713/187 |
| 2008/0313453 A1 * | 12/2008 | Booth et al. ....................... 713/2 |
| 2009/0031202 A1 * | 1/2009 | Branda et al. ................. 714/807 |
| 2011/0078430 A1 * | 3/2011 | McCoull et al. .................. 713/2 |
| 2011/0202752 A1 * | 8/2011 | Fujiwara et al. .................. 713/2 |

* cited by examiner

*Primary Examiner* — John Trimmings
(74) *Attorney, Agent, or Firm* — Thomas R. Lane

(57) ABSTRACT

Embodiments of an invention for verifying firmware using system memory error check logic are disclosed. In one embodiment, an apparatus includes an execution core, firmware, error check logic, non-volatile memory, comparison logic, and security logic. The error check logic is to generate, for each line of firmware, an error check value. The comparison logic is to compare stored error check values from the non-volatile memory with generated error check values from the error check logic. The security logic is to prevent the execution core from executing the firmware if the comparison logic detects a mismatch between the stored error code values and the generated error code values.

20 Claims, 3 Drawing Sheets

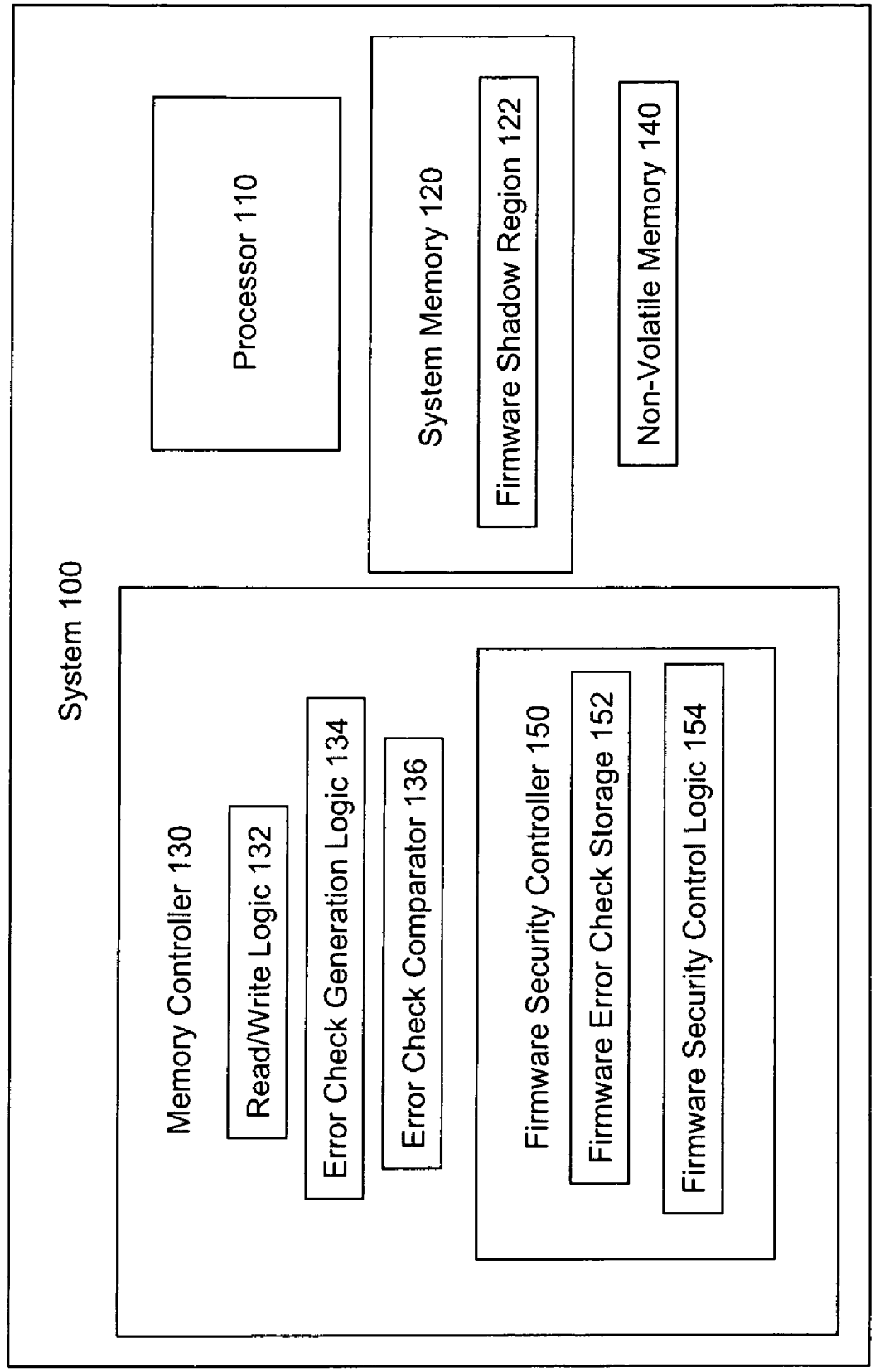

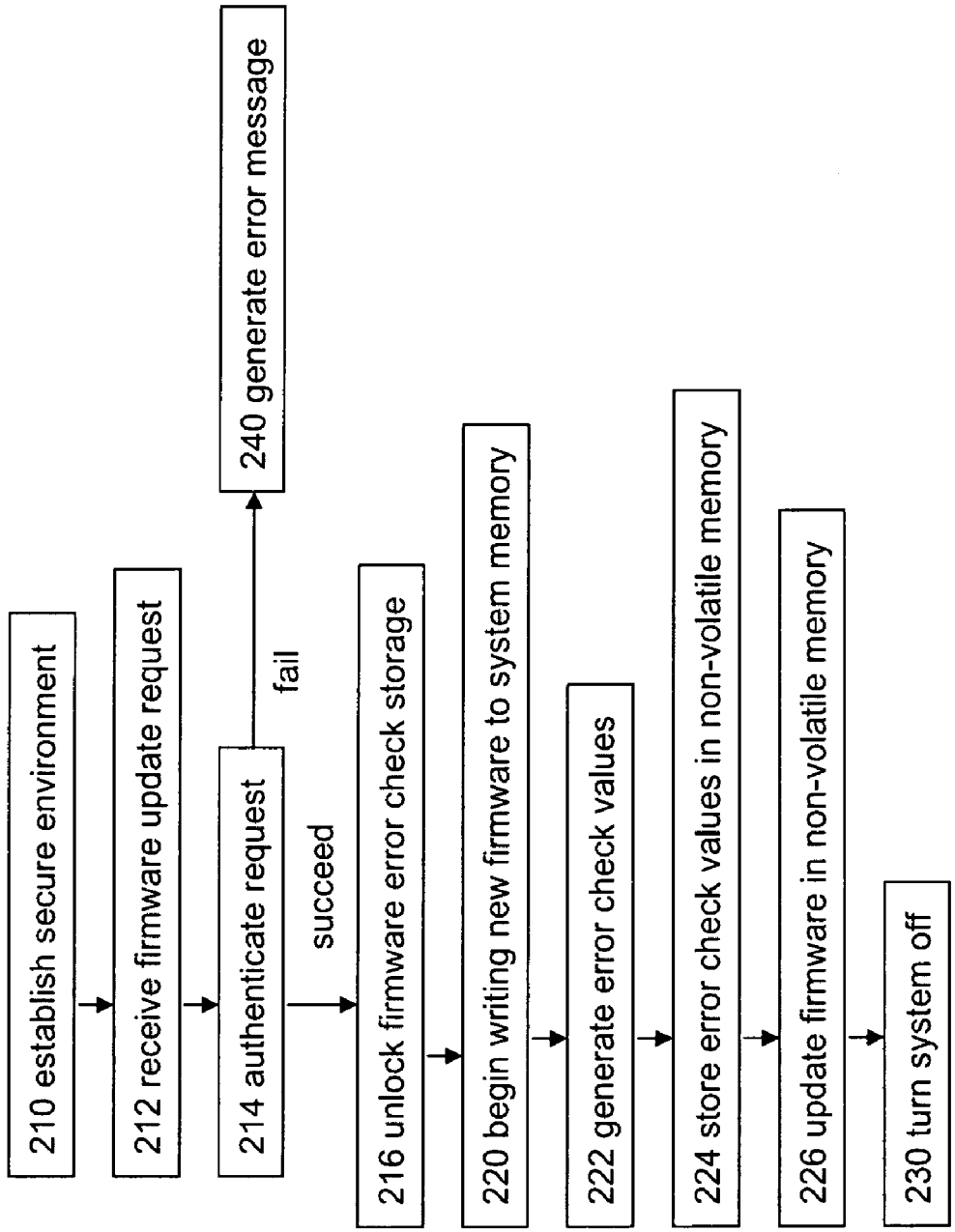

FIRMWARE VERIFICATION USING SYSTEM MEMORY ERROR CHECK LOGIC

BACKGROUND

1. Field

The present disclosure pertains to the field of information processing, and more particularly, to the field of security in information processing systems.

2. Description of Related Art

Information processing systems typically include a programmable non-volatile memory, such as an electrically erasable programmable read only memory ("EEPROM") or flash memory, for storing a bootstrap loader, a basic input/output system ("BIOS"), and other firmware. The code stored in this non-volatile memory may be modified for updates and patches, but is retained when the system is powered down. Therefore, it may be the target of malicious attacks on the information processing system.

One approach to preventing these attacks has been to store a checksum or other error code value in the non-volatile memory, which is generated from code stored in the non-volatile memory. The bootstrap loader may then use this checksum to verify that this code has not been corrupted, before allowing it to be loaded to system memory or executed. However, if the bootstrap loader or checksum has itself been corrupted, then this approach may fail.

BRIEF DESCRIPTION OF THE FIGURES

The present invention is illustrated by way of example and not limitation in the accompanying figures.

FIG. 1 illustrates a system providing for firmware verification according to an embodiment of the present invention.

FIG. 2 illustrates a method for firmware update according to an embodiment of the present invention.

FIG. 3 illustrated a method for firmware verification according to an embodiment of the present invention.

DETAILED DESCRIPTION

Embodiments of an invention for verifying firmware are described. In this description, numerous specific details, such as processor and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention. For example, a complete description of error check value generation is not provided, as a number of known approaches may be used in embodiments of the present invention.

FIG. 1 illustrates information processing system 100, in which firmware may be verified according to an embodiment of the present invention. System 100 may be personal computer, a mainframe computer, a portable computer, a handheld device, a set-top box, a server, or any other information processing system. In this embodiment, system 100 includes processor 110, system memory 120, memory controller 130, and non-volatile memory 140.

Processor 110 may include any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a special purpose processor or microcontroller, or may be a reconfigurable core (e.g. a field programmable gate array). Although FIG. 1 shows only one such processor 110, system 100 may include any number of processors, each including any number of execution cores and threads, in any combination.

System memory 120 may include any medium on which information, such as data and/or program code, may be stored, such as static or dynamic random access memory, semiconductor-based read-only or flash memory, magnetic or optical disk memory, or any other type of medium readable by processor 110, or any combination of such media. System memory 120 may include one or more different media, and may be fabricated, packaged, or otherwise arranged as a single memory or multiple distinct memories. System memory 120 may be formatted to include a dedicated firmware shadow region 122, for use according to embodiments of the present invention.

Memory controller 130 may include any circuitry, logic, or other structures to maintain the contents of system memory 120, and to support the access to and protection of memory 120 by and from processor 110 and any other agents in system 100. Memory controller 130 may be a discrete component, or its functions may be integrated, partially, totally, redundantly, or according to a distributed scheme into or with any other component or components, including processor 110, memory controller 130, or a chipset or bus bridge. In this embodiment, memory controller 130 includes read/write logic 132, error check generation logic 134, error check comparator 136, and firmware security controller 150; any of which may be included in a component other than memory controller 130 in other embodiments.

Non-volatile memory 140 may include any form of non-volatile memory, such as EEPROM or flash memory, on which a bootstrap loader, BIOS, or other firmware may be stored.

Processor 110, system memory 120, memory controller 130, and non-volatile memory 140 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

System 100 may be configured to support operation in a secure system environment, according to any known approach. A secure system environment may include a trusted partition and an un-trusted partition. The bare platform hardware of the system and trusted software may be included in the trusted partition. Direct access from the un-trusted partition to the resources of the trusted partition may be prevented.

In one embodiment, the bare platform hardware of the system may be included in the trusted partition through the execution of a secure system entry protocol. For example, an initiating processor, such as processor 110, may execute a secure enter ("SENTER") instruction, to which all agents in the system must respond appropriately in order for the protocol to succeed. The responding agents may be prevented from executing any program instructions or process any external transactions during the secure entry process, so that the initiating processor may validate a signed module as authentic and trusted, execute the signed module to configure the system to support trusted operations, and measure (cryptographically, using a hash extend function) and then initiate the execution of a measured virtual machine monitor ("MVMM"). The MVMM may create one or more virtual machine environments in which to run un-trusted software, such that un-trusted software does not have direct access to system resources.

Returning to memory controller 130, read/write logic 132 may include any circuitry, logic, or other structures to control the writing and reading of information to and from system memory 120 by processor 110 and/or any other agent in system 100. Information of any size may be written to or read from system memory 120, for example, information may be written to or read from system memory 120 as 64-bit or 128-bit words of data.

Error check generation logic 134 may include any circuitry, logic, or other structures to generate error check values for the information stored or to be stored in system memory 120. The error check values may be used for error detection only, or for error detection and correction, and may be generated using any approach, such as parity for error detection only, or an error correction code (ECC), such as Hamming code, for error detection and correction. Error check values may be generated in connection with the writing and or reading of information to system memory 120, and stored with the corresponding information in system memory 120 in connection with writing the information to system memory 120. For example, where information is stored as 64-bit data words in system memory 120, an 8-bit ECC value may be generated in connection with writing each 64-bit data word to system memory 120, where each bit of the 8-bit ECC value is generated by calculating parity over a unique half of the 64 data bits, and stored with (i.e., in connection with storing the data word, in such a way as to be accessible when the data word is accessed) the corresponding 64-bit data word in system memory 120. Then, the ECC or other error check value may be used to detect, and in some embodiments, correct, an error in the corresponding data value when the data value is read from memory, or from time to time by memory controller 130 as part of maintaining system memory 120. Data words of other sizes, such as 128-bit data words, may be used in other embodiments of the present invention.

Error check comparator 136 may include any circuitry, logic, or other structures to compare error check values, for example, an error check value generated by error check generation logic 134 with an error check value stored in system memory 120 or in firmware error check storage 152 (described below), according to any known technique.

In this embodiment, firmware security controller 150 includes firmware error check storage 152 and firmware security control logic 154. Firmware error check storage 152 may include any type of non-volatile memory, such as EEPROM or flash memory, to store certain error check values generated by error check generation logic 134, as described below. Firmware error check storage 152 may be redundant to error check storage provided, if any, in system memory 120, in that certain error check values may be stored in both firmware error check storage 152 and in system memory 120. Firmware error check storage 152 may be locked using any known hardware or software technique, so as to prevent its contents from being changed, except by trusted and/or authenticated software after a secure system environment has been established in system 100.

Firmware security control logic 154 may include any type of circuitry, logic, or other structure to cause memory controller 130 to store error check values for firmware updates in firmware error check storage 152, to cause error check generation logic 134 to generate error check values for instructions from non-volatile memory 140, to cause error check comparator 136 to compare the error check values generated for instructions from non-volatile memory 140 with the error check values stored in firmware error check storage 152, to prevent processor 110 from executing instructions from non-volatile memory 140 if error check comparator 136 finds a mismatch between the error check values generated for instructions from non-volatile memory 140 and the error check values stored in firmware error check storage 152, all as further described below, and to otherwise cause memory controller 130 to perform operations in method embodiments of the present invention, including, but not limited, to those described below. In particular, firmware security control logic 154 may prevent the contents of firmware error check storage 152 from being changed, except by trusted and/or authenticated software after a secure system environment has been established in system 100.

FIG. 2 illustrates method 200 for updating firmware according to an embodiment of the present invention. In the description of the method embodiment of FIG. 2, reference may be made to the system embodiment of FIG. 1; however, method embodiments of the invention are not limited in this respect.

In box 210, a secure system environment is established in system 100. In box 212, system 100 receives a firmware update request and new firmware. The request and the new firmware may be received from a remote server, for example through the use of Intel® Active Management Technology, and the new firmware may be encrypted and may include a patch or update to a bootstrap loader or any other firmware stored in non-volatile memory 140. In box 214, the firmware update request and/or the new firmware are authenticated to determine that the firmware update request and/or the new firmware are authentic and that the requestor has privilege to update the firmware. If it is determined, in box 214, that the firmware update request and/or the new firmware is not authentic or that the requestor does not have privilege to update the firmware, then, in box 240, an error message may be generated and the firmware not updated. In box 216, firmware error check storage 152 is unlocked to allow its contents to be updated in connection with the requested and authenticated firmware update.

In box 220, memory controller 130 begins to write the new firmware to system memory 120, for example, to firmware shadow region 122. The new firmware may be written from a remote server, or from a different region of system memory, having already been written from a remote server in box 212. In box 222, in connection with the writing of a word or line of the new firmware into system memory 120, error check generation logic 134 generates an error check value. In another embodiment, the error check value may be generated by software, for example by using an Intel® Active Management Technology management engine. In box 224, the error check value generated in box 222 is stored in firmware error check storage 152. Each error check value may also be stored in system memory 120 along with the corresponding word or line of new firmware, according to an ECC or other error detection protocol. Boxes 222 and 224 are repeated for each word of the new firmware. In box 226, the new firmware is written to non-volatile memory 140.

In box 230, system 100 is turned off. In one embodiment, while system 100 is off, the contents of system memory 120 may be erased; however, the contents of non-volatile memory 140, including the new firmware, and firmware error check storage 152 are retained. In another embodiment, where system memory 120 does not get powered off, the new firmware may be not be written to non-volatile memory 140, but instead, may be left in firmware shadow region 122, so the size of the firmware is not limited by the size of non-volatile memory 140.

FIG. 3 illustrates method 300 for verifying firmware according to an embodiment of the present invention. In the description of the method embodiment of FIG. 3, reference may be made to the system embodiment of FIG. 1; however, method embodiments of the invention are not limited in this respect.

In box 310, system 100 is turned on. In box 320, memory controller 130 begins to verify a bootstrap loader stored in non-volatile memory 140. Processor 110 is prevented from executing the bootstrap loader, for example, by a signal from memory controller 130, until it is successfully verified. In one embodiment, the bootstrap loader may be written to system memory 120, for example, to firmware shadow region 122, in connection with the verification. In box 322, error check generation logic 134 generates an error check value for a word or a line of the bootstrap loader. In one embodiment, the error check value is generated in connection with writing the word or line to system memory 120. In box 324, error check comparator 136 compares the error check value generated in box 322 with the error check value stored in firmware error check storage 152 for that word of the bootstrap loader. If a mismatch is detected in box 324, then, in box 350, an error message may be generated and system 100 not booted. Boxes 322 and 324 are repeated for each word or line of the bootstrap loader. If box 324 is successful for every word or line of the bootstrap loader, then, in box 326, the bootstrap loader is executed, from non-volatile memory 140, or from firmware shadow region 122 if it has been written there. In one embodiment, the bootstrap loader may be executed word by word or line by line, as each word or line is successfully verified.

In box 330, system 100 enters a power-saving mode in which the contents of system memory 120 are maintained. Instructions to resume from this power-saving mode may be stored in non-volatile memory 140, and, in an embodiment of the present invention, may be written to firmware shadow region 122 prior to entry into the power-saving mode, for example, in connection with box 322, as part of or along with the bootstrap loader.

Then, in box 340, system 100 exits the power-saving mode. In box 342, memory controller 130 begins to verify the resume code stored in firmware shadow region 122. Processor 110 is prevented from executing the resume code until it is successfully verified. In box 344, error check generation logic 134 generates an error check value for a word or line of the resume code. In box 346, error check comparator 136 compares the error check value generated in box 344 with the error check value stored in firmware error check storage 152 for that word or line of the resume code. If a mismatch is detected in box 346, then, in box 350, an error message may be generated and system 100 does not execute the resume code. Boxes 344 and 346 are repeated for each word or line of the resume code. If box 346 is successful for every word or line of the resume code, then, in box 348, the resume code is executed from firmware shadow region 122 instead of from non-volatile memory 140. In one embodiment, the resume code may be executed word by word or line by line, as each word or line is successfully verified.

Within the scope of the present invention, the methods illustrated in FIGS. 2 and 3 may be performed in a different order, with illustrated boxes omitted, with additional boxes added, or with a combination of reordered, omitted, or additional boxes.

The booting of system 100, the establishment of a secure system environment in system 100, the execution and updating of firmware in non-volatile memory 140, the writing and reading of information to and from system memory 120, the use of error detection and correction to maintain information stored in system memory 120, and any other functions or operations in system 100 may be performed according to any known approach, unless otherwise set forth in this description.

Processor 110, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for verifying firmware have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. For example, embodiments of the present invention may be used to verify device drivers and operating system code. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
an execution core;
firmware;
error check logic to generate error check values for each line of firmware;
a first non-volatile memory;
comparison logic to compare stored error check values from the non-volatile memory with generated error check values from the error check logic; and
security logic to prevent the execution core from executing the firmware if the comparison logic detects a mismatch between the stored error check values and the generated error check values.

2. The apparatus of claim 1, further comprising a second non-volatile memory, wherein the error check logic is to generate the error check value in connection with reading the line of firmware from the second non-volatile memory.

3. The apparatus of claim 1, further comprising system memory, wherein the error check logic is to generate the error check value in connection with writing the line of firmware to the system memory.

4. The apparatus of claim 1, wherein the firmware includes a bootstrap loader.

5. The apparatus of claim 1, wherein the error check logic includes error correction code logic.

6. A method comprising:
generating an error check value for a line of firmware;
comparing the generated error check value with a stored error check value;
executing the line of firmware only if the generated error check value matches the stored error check value.

7. The method of claim 6, further comprising repeating the generating, comparing, and executing for each line of the firmware.

8. The method of claim 6, further comprising reading the line of firmware from a non-volatile memory in connection with generating the error check value.

9. The method of claim 6, further comprising writing the line of firmware to a system memory in connection with generating the error check value.

10. The method of claim 6, further comprising executing the firmware from the system memory.

11. The method of claim 6, further comprising reading the stored error check value from a non-volatile memory prior to comparing.

12. The method of claim 11, further comprising writing the stored error check value to the non-volatile memory prior to reading.

13. The method of claim 12, further comprising establishing a secure system environment prior to writing.

14. The method of claim 11, further comprising generating the stored error check value from a firmware update prior to writing.

15. The method of claim 14, further comprising authenticating the firmware update prior to writing.

16. An apparatus comprising:
error check logic to generate an error check value for a line of firmware;
comparison logic to compare the generated error check value with a stored error check value; and
security logic to prevent an execution core from executing the line of firmware if the comparison logic detects a mismatch between the generated error check value and the stored error check value.

17. The apparatus of claim 16, further comprising read logic to read the line of firmware from a non-volatile memory in connection with the error check logic generating the error check value.

18. The apparatus of claim 16, further comprising write logic to write the line of firmware to a system memory in connection with the error check logic generating the error check value.

19. The apparatus of claim 16, wherein the stored error check value is stored in a non-volatile memory.

20. The apparatus of claim 19, wherein the security logic is to prevent writes to the non-volatile memory except for an authenticated firmware update.

\* \* \* \* \*